(12) United States Patent
Alves

(10) Patent No.: US 9,965,210 B2
(45) Date of Patent: May 8, 2018

(54) SYSTEM AND METHODS FOR IN-STORAGE ON-DEMAND DATA DECOMPRESSION

(71) Applicant: NGD Systems, Inc., Irvine, CA (US)

(72) Inventor: Vladimir Alves, Tustin, CA (US)

(73) Assignee: NGD Systems, Inc., Irvine, CA (US)

( * ) Notice: Subject to any disclaimer, the term of this patent is extended or adjusted under 35 U.S.C. 154(b) by 0 days. days.

(21) Appl. No.: 15/607,314

(22) Filed: May 26, 2017

(65) Prior Publication Data

US 2017/0344304 A1 Nov. 30, 2017

Related U.S. Application Data

(60) Provisional application No. 62/342,766, filed on May 27, 2016.

(51) Int. Cl.
*G06F 13/12* (2006.01)
*G06F 3/06* (2006.01)
(52) U.S. Cl.
CPC .......... *G06F 3/0638* (2013.01); *G06F 3/0608* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,396,608 A * | 3/1995 | Garde | G06F 12/04 365/230.02 |
| 9,020,912 B1 * | 4/2015 | Majee | H04L 12/4675 707/693 |
| 2008/0170611 A1 * | 7/2008 | Ramaswamy | H04N 19/61 375/240.01 |
| 2013/0191590 A1 * | 7/2013 | Malwankar | G06F 3/0611 711/114 |

* cited by examiner

*Primary Examiner* — Duc Doan
(74) *Attorney, Agent, or Firm* — Lewis Roca Rothgerber Christie LLP

(57) ABSTRACT

A system and methods for in-storage on-demand data decompression. Compressed data are stored in a storage device connected to a host computer. When decompressed data are needed, the host computer sends a decompression command to the storage device indicating which data are to be decompressed, and instructing it how to decompress the data. The storage device decompresses the data and stores the decompressed data, making it available to the host.

17 Claims, 9 Drawing Sheets

SYSTEM AND METHODS FOR IN-STORAGE ON-DEMAND DATA DECOMPRESSION

CROSS-REFERENCE TO RELATED APPLICATION(S)

The present application claims priority to and the benefit of U.S. Provisional Application No. 62/342,766, filed May 27, 2016, entitled SYSTEM AND METHODS FOR IN-STORAGE ON-DEMAND DATA DECOMPRESSION", the entire content of which is incorporated herein by reference.

FIELD

One or more aspects of embodiments according to the present invention relate to data storage, and more particularly to the storage of compressed data.

BACKGROUND

In various situations, data to be stored may be compressed before storage, and/or before transmission to a data storage system. Compressing the data may reduce the cost of transmission and the cost of storage. A storage system may include a host computer and one or more storage devices. Subsequently retrieving the data from storage for use may involve fetching the data from a storage device by the host computer, decompressing the data, and storing the decompressed data back on the storage device. This process may burden the host computer, diminishing its ability to perform other operations, and it may consume significant amounts of power.

Thus, there is a need for an improved system and method of retrieving compressed data from storage.

SUMMARY

Aspects of embodiments of the present disclosure are directed toward a system and methods for in-storage on-demand data decompression. Compressed data are stored in a storage device connected to a host computer. When decompressed data are needed, the host computer sends a decompression command to the storage device indicating which data are to be decompressed, and instructing it how to decompress the data. The storage device decompresses the data and stores the decompressed data, making it available to the host.

According to an embodiment of the present invention there is provided a storage device, including: a storage interface, configured to be connected to a host computer, a digital circuit; and persistent storage media, the digital circuit being configured to: receive, from the host computer, through the storage interface, a decompression command including: an identifier, identifying a quantity of compressed data; and decompression instructions for decompressing the quantity of compressed data; retrieve the quantity of compressed data from the storage media; and decompress the compressed data, according to the decompression instructions.

In one embodiment, the digital circuit is further configured to: receive, from the host computer, through the storage interface, a location identifier, identifying a destination location where the decompressed data are to be stored; and store the decompressed data at the destination location.

In one embodiment, the digital circuit is further configured to send a completion message to the host computer, after the compressed data have been decompressed.

In one embodiment, the storage device is configured as an object store, and the quantity of data is an object.

In one embodiment, the digital circuit is a processing circuit configured to decompress the compressed data by directly executing the decompression instructions.

In one embodiment, the digital circuit is a processing circuit configured to translate the decompression instructions into directly executable instructions, and to decompress the compressed data by directly executing the directly executable instructions.

In one embodiment, the digital circuit is a programmable digital circuit, and the decompression instructions are a logic program.

In one embodiment, the digital circuit is a digital signal processor having an instruction word length greater than 32 bits.

In one embodiment, the digital circuit includes a hardware accelerator configured to execute a plurality of functions, each of the functions being a component of one or more of a plurality of decompression methods.

In one embodiment, the digital circuit includes: a first hardware decompressor configured to perform decompression according to first decompression method; and a second hardware decompressor configured to perform decompression according to second decompression method, and wherein the decompression instructions include an identifier identifying one member of a list of decompression methods.

In one embodiment, the storage interface is selected from the group consisting of Serial Advanced Technology Attachment (SATA), Fibre Channel, Small Computer System Interface (SCSI), Serial Attached SCSI (SAS), Peripheral Component Interconnect Express (PCIe), Non Volatile Memory Express (NVMe), SCSI over PCIe, Ethernet, and Universal Serial Bus (USB).

In one embodiment, the storage interface is NVMe, and the decompression command is part of an NVMe command, the NVMe command having an address selected from among a range of addresses reserved for transmission of decompression commands to the storage device.

In one embodiment, the decompression command is part of a payload of a transmission control protocol/internet protocol (TCP/IP) packet, the TCP/IP packet being part of the payload of the NVMe command.

According to an embodiment of the present invention there is provided a method for operating a storage device including persistent storage media and connected, through a storage interface, to a host computer, the method including: receiving, by the storage device, from the host computer, through the storage interface, a decompression command including: an identifier, identifying a quantity of compressed data; and decompression instructions for decompressing the quantity of compressed data; retrieving the quantity of compressed data from the storage media; and decompressing the compressed data, according to the decompression instructions.

In one embodiment, the method includes: receiving, from the host computer, through the storage interface, a location identifier, identifying a destination location where the decompressed data are to be stored; and storing the decompressed data at the destination location.

In one embodiment, the decompressing of the compressed data, according to the decompression instructions, includes decompressing of the compressed data by directly executing the decompression instructions.

In one embodiment, the decompressing of the compressed data, according to the decompression instructions, includes translating the decompression instructions into directly executable instructions, and decompressing of the compressed data by directly executing the directly executable instructions.

In one embodiment, the decompressing of the compressed data, according to the received instructions, includes configuring a programmable digital circuit according to the received instructions, and decompressing of the compressed data by the programmable digital circuit.

In one embodiment, the storage interface is Non Volatile Memory Express (NVMe), and the decompression command is part of an NVMe command, the NVMe command having an address selected from among a range of addresses reserved for transmission of decompression commands to the storage device.

In one embodiment, the decompression command is part of a payload of a transmission control protocol/internet protocol (TCP/IP) packet, the TCP/IP packet being part of the payload of the NVMe command.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and methods for in-storage on-demand data decompression provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
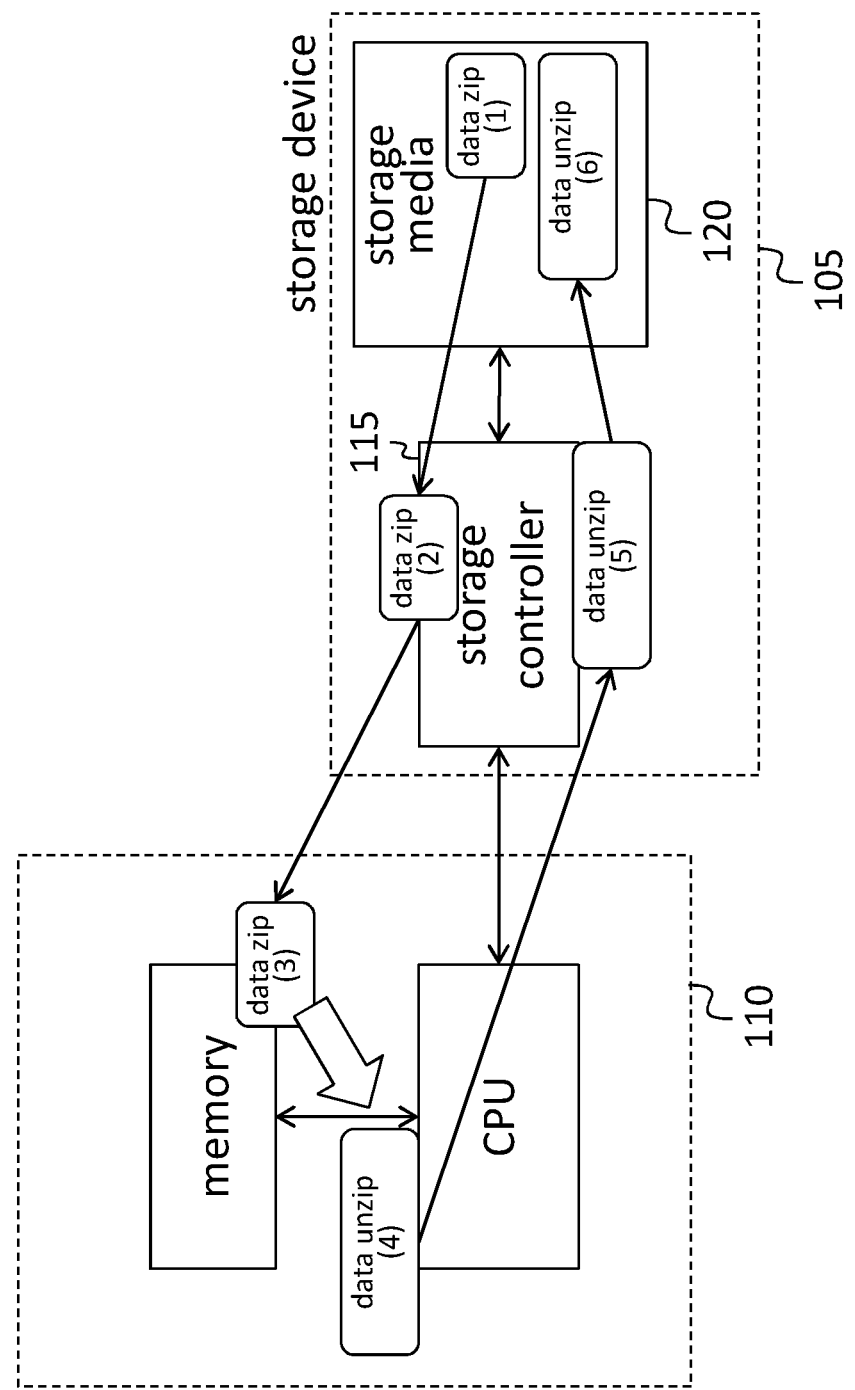
FIG. 1 is a block diagram of a system for retrieving and decompressing compressed data.

Referring to FIG. 1, in various situations, compressed data may be stored on a storage device 105 (e.g., a solid state drive (SSD)) connected to a host 110 (e.g., a server or other host computer). The storage device 105 may include a storage controller 115 and persistent storage media 120, which may be a plurality of flash memory devices, for example, or any other suitable storage media. When the decompressed data are needed, e.g., for processing, or for display to a viewer (e.g., if the data are photographs or videos), the compressed data (labeled "data zip" in FIG. 1) may be retrieved from the storage device 105 by the host 110, decompressed by the host 110, and, for example, if the decompressed data (labeled "data unzip" in FIG. 1) are too large to fit in the memory of the host 110, the decompressed data may be again stored in the storage device.

The storage device 105 may, in operation, provide storage for the host. The host interface (including the host connector, and the communications protocols) between the storage device 105 and the host may be, for example, a storage interface such as Serial Advanced Technology Attachment (SATA), Fibre Channel, Small Computer System Interface (SCSI), Serial Attached SCSI (SAS), Peripheral Component Interconnect Express (PCIe), Non Volatile Memory Express (NVMe), SCSI over PCIe, or a more general-purpose interface such as Ethernet or Universal Serial Bus (USB). In some embodiments, the storage device 105 may conform to a 3.5 inch hard drive form-factor (or "large form factor" (LFF)) standard, or it may conform to a 2.5 inch hard drive form-factor (or small form factor (SFF)) standard. In other embodiments the storage device 105 may conform to a standard PCIe card form factor, e.g., a full-height, full length (FH-FL) card outline, or a full-height, half length (FH-HL) outline.

Figure 2:
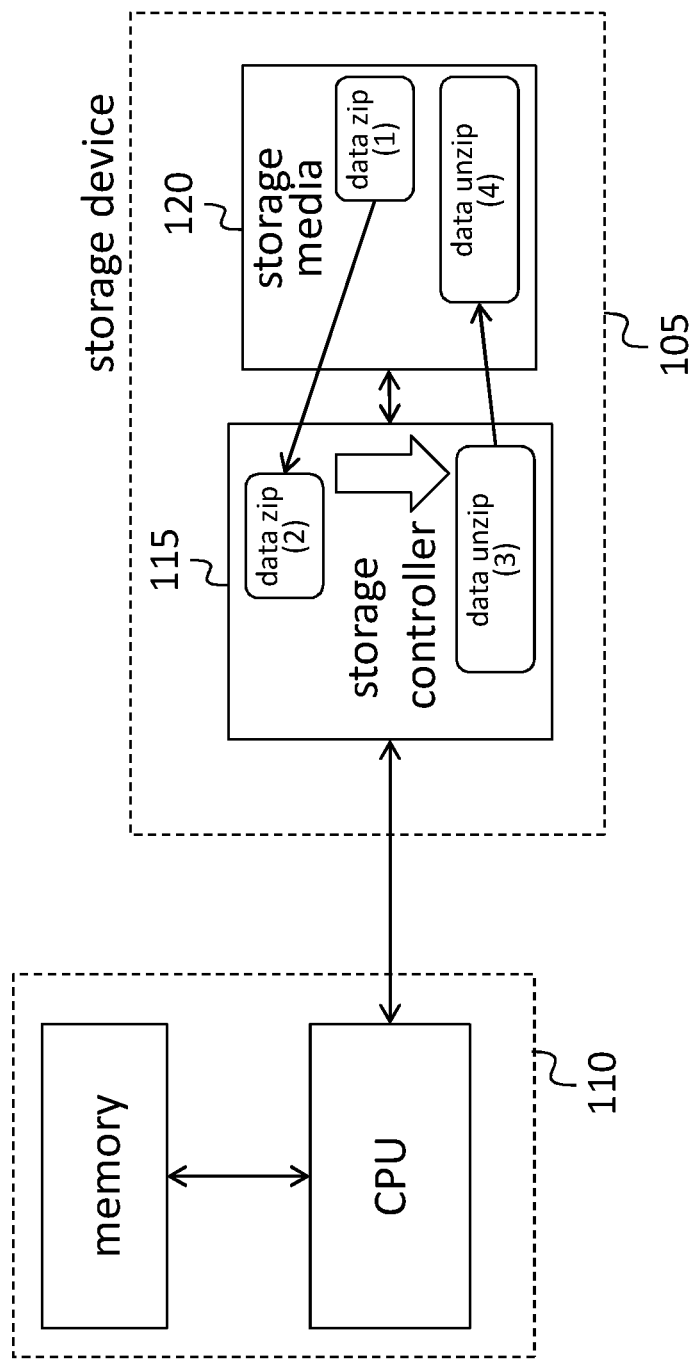
FIG. 2 is a block diagram of a system for performing in-storage decompression, according to an embodiment of the present invention.

Referring to FIG. 2, in some embodiments, instead of being performed in the host 110, the decompression is performed in the storage device 105, by the storage controller 115. The decompression algorithm used to decompress the data may not be known in advance and may not be the same for all of the data, which in general may have been compressed at or near their original source (e.g., to reduce the cost of transmission). Accordingly, the storage controller may be capable of using any of various algorithms, or of using an arbitrary algorithm, to decompress the data.

When decompressed data are needed, the host 110 may send a decompression command to the storage device 105 requesting that a quantity of data (e.g., one or more files, one or more logical blocks, one or more objects, or the like) be decompressed and made available. As used herein, a "quantity of data" is a collection of bits (e.g., a collection of bytes) that may, for example, correspond to a data file or an object. A "quantity of compressed data" is a collection of bits that is the product of a compression algorithm. The decompression command may include (i) an identifier, identifying the quantity of compressed data to be decompressed, (ii) instructions for decompressing the quantity of compressed data (or "decompression instructions"), and (iii) a "destination location", i.e., a location identifier identifying where the decompressed data are to be stored. For example, if the storage device is configured as an object store, the identifier may be an object identifier, e.g., a 64-bit key identifying a compressed data object; in the case of a solid state drive, the identifier may be one or more addresses or address ranges (e.g., logical block addresses), that may be mapped by a flash translation layer implemented in the storage controller 115 to one or more physical addresses or address ranges in the flash memory. The instructions for decompressing the compressed data may take various forms. For example, these instructions may be machine code, directly executable by a processing circuit (e.g., a microcontroller, a microprocessor, or a digital signal processor (DSP)), that when executed convert compressed data into decompressed data. In other embodiments the instructions are "higher level instructions", i.e., code that is not directly executable by a processing circuit but instead is compiled or interpreted, and then executed by a processing circuit. In an embodiment in which the storage controller 115 includes more than one processing circuit, the interpreting or compiling may be performed by the same processing circuit as the executing of the resulting machine code, or by another processing circuit. The indication of where the decompressed data are to be stored may be a set of logical addresses or address ranges. In the case of an object store, the indication of where the decompressed data are to be stored may be absent, and the storage controller 115 may either store the decompressed data in the same object (i.e., the object identifier may be mapped to the decompressed data at the completion of the decompression operation), or the storage controller 115 may create a new data object, store the decompressed data in the new object, and return, to the host 110, an object identifier for the new object.

As used herein, a "storage controller" is a circuit in a single package, such as a quad flat package, a low-profile quad flat package, a small outline package, a thin small-outline package, a ball grid array, or the like, and containing at least one processing circuit, a circuit for interfacing to the host (a "host control interface circuit"), and a circuit for interfacing to the storage media. As used herein, a "processing circuit" is a digital circuit (e.g., a microcontroller, a microprocessor, a digital signal processor, or a programmable logic device (e.g., a field programmable gate array (FPGA)) capable of receiving instructions and data, and performing operations on the received data according to the instructions. As used herein, a "programmable digital circuit" is a digital circuit (such as an FPGA, or a complex programmable logic device (CPLD)), including a plurality of gates and flip-flops, the characteristics of and/or connections between which may be determined by loading, into the programmable digital circuit, configuration data (e.g., an SRAM object file, for an FPGA), referred to herein as a "logic program".

Figure 3:
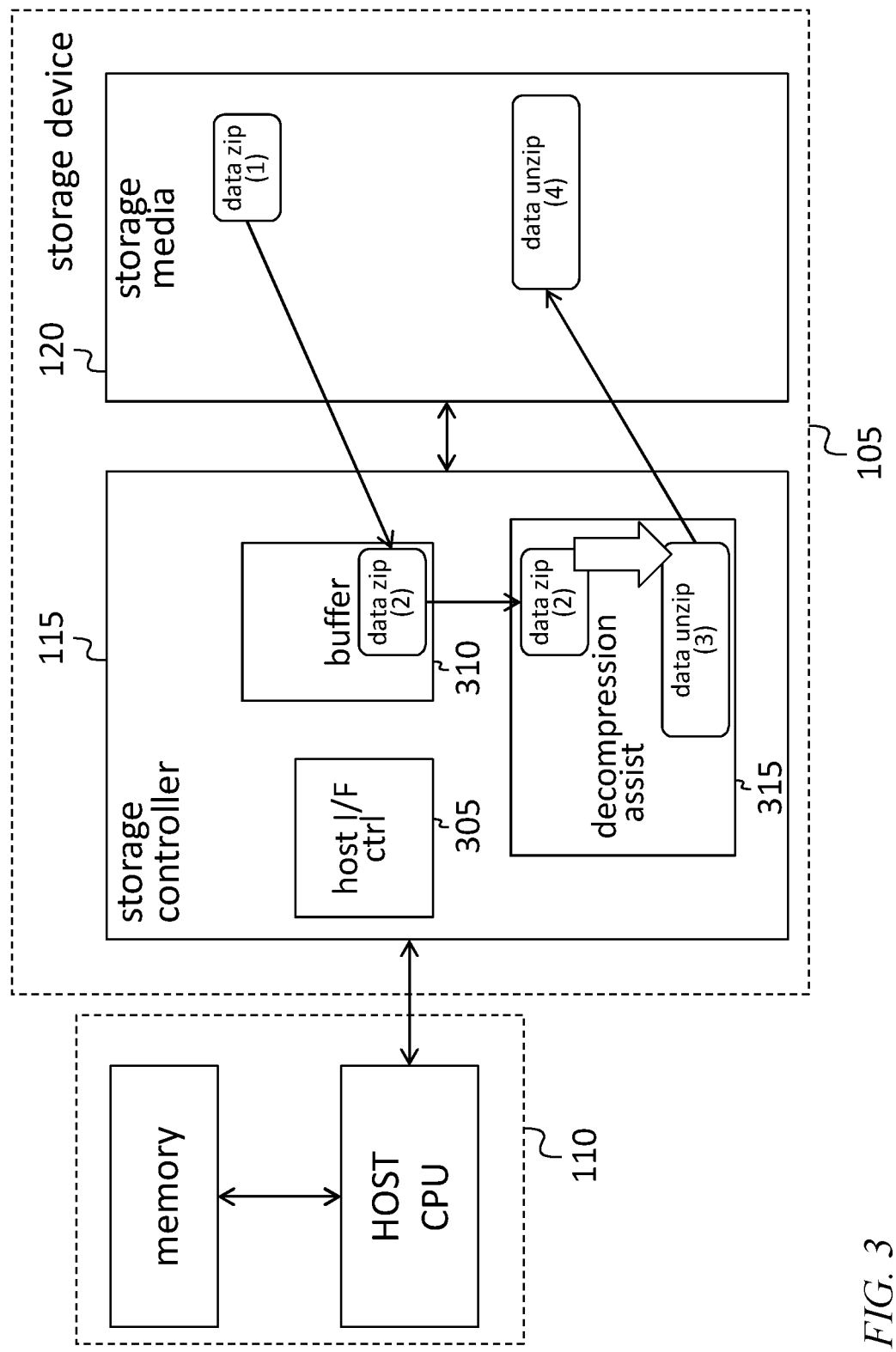
FIG. 3 is a block diagram of a system for performing in-storage decompression, according to an embodiment of the present invention.

Referring to FIG. 3, in some embodiments the storage controller 115 includes a host control interface 305 (as mentioned above), a buffer 310, and a decompression assist circuit 315. In operation, when the storage controller 115 receives a decompression command, it fetches the data to be decompressed from the storage media 120, stores the data in the buffer 310, decompresses them, using the decompression assist circuit 315, according to the decompression instructions, and stores the resulting decompressed data at the destination location in the storage media 120. If the data to be decompressed do not fit into the buffer, the decompression operation may be performed piecemeal, i.e., one portion at a time, of the data to be decompressed, may be decompressed.

Figure 4:
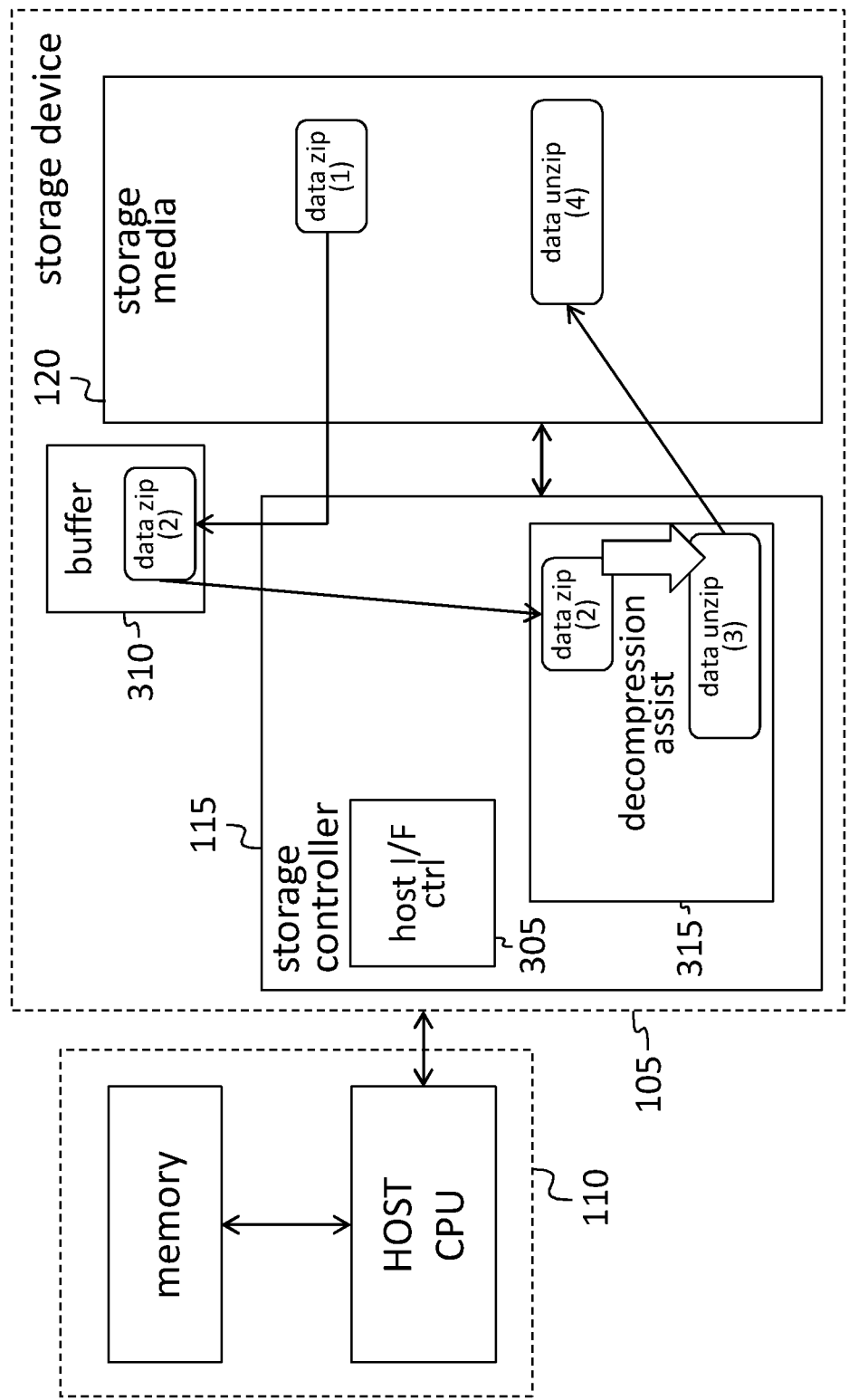
FIG. 4 is a block diagram of a system for performing in-storage decompression, according to an embodiment of the present invention.

Referring to FIG. 4, in some embodiments, the buffer 310 is not within the storage controller 115 but is instead external, e.g., it may include (e.g., consist of) one or more dynamic random access memory (DRAM) chips installed on a printed circuit board with the storage controller 115 and connected to the storage controller 115 by, e.g., printed circuit board traces. The operation of the system of FIG. 4 may be substantially the same as that of the system of FIG. 3.

Figure 5:
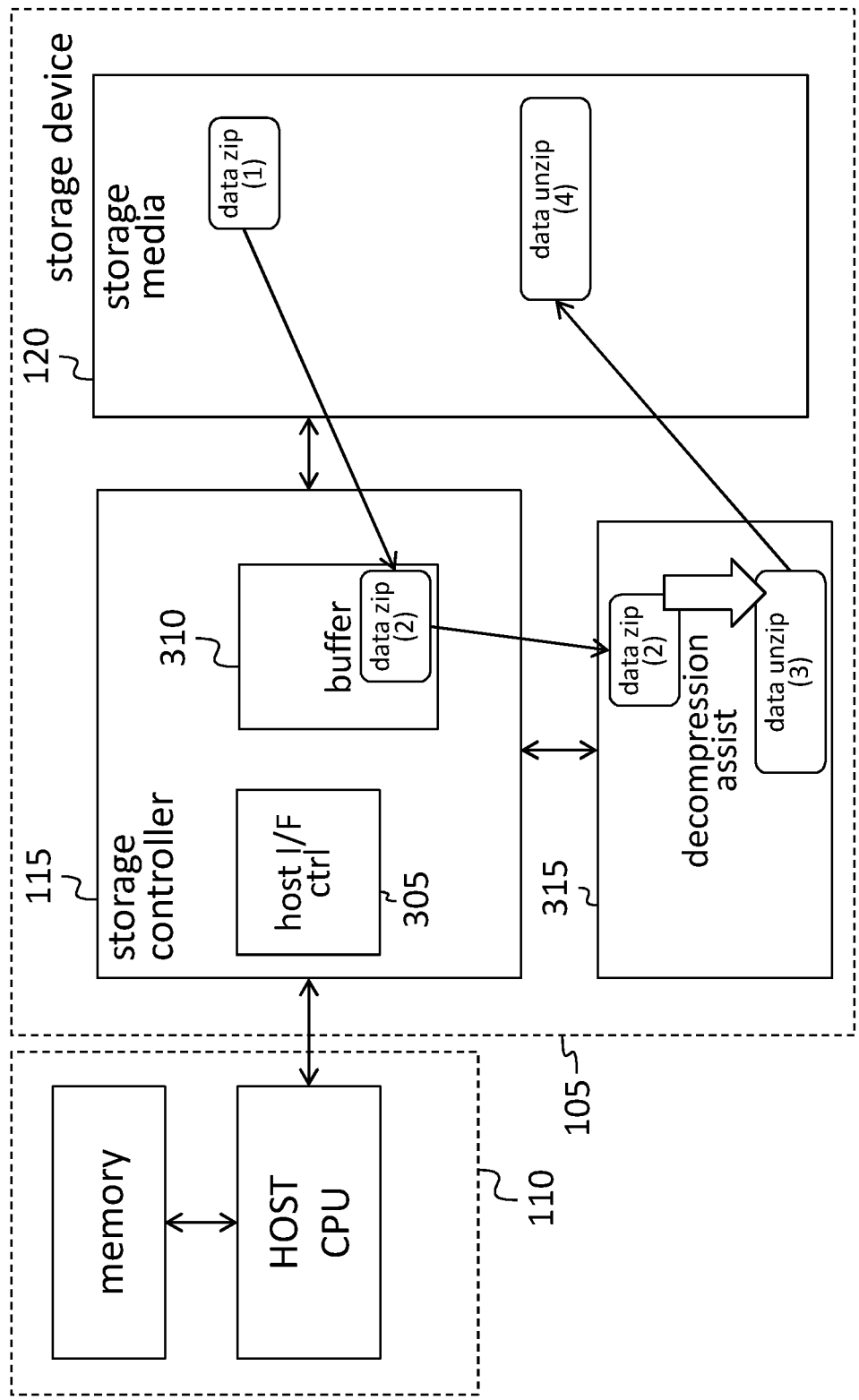
FIG. 5 is a block diagram of a system for performing in-storage decompression, according to an embodiment of the present invention.

Referring to FIG. 5, in some embodiments, the decompression assist circuit 315 is not within the storage controller 115 but is instead external, e.g., it may include (e.g., consist of) one or more processing circuits installed on a printed circuit board with the storage controller 115 and connected to the storage controller 115 by, e.g., printed circuit board traces. The operation of the system of FIG. 5 may be substantially the same as that of the system of FIG. 3. Compressed data may be copied from the storage media into the buffer 310 by the storage controller 115. The compressed data may be read from the buffer 310 by the decompression assist circuit 315 and decompressed, and the decompressed data may then be written back to the storage media 120. In some embodiments the decompression assist circuit 315 has a direct connection to the storage media 120 as illustrated, so that both the storage controller 115 and the decompression assist circuit 315 are able to access the storage media 120 directly; in other embodiments only the storage controller 115 has direct access to the storage media 120 and the decompressed data are returned by the decompression assist circuit 315 to the storage controller 115 for writing to the storage media 120.

Figure 6:
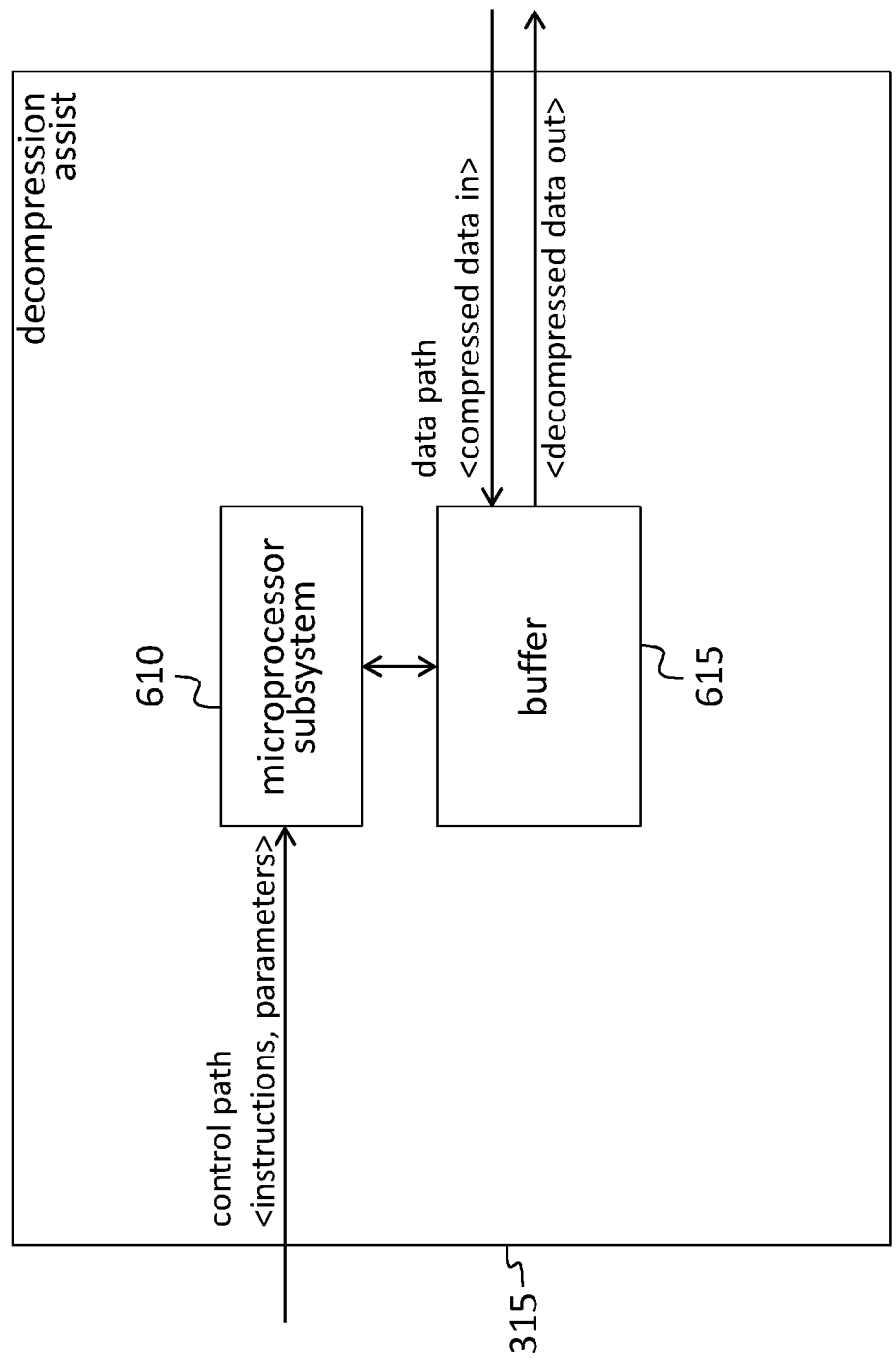
FIG. 6 is a block diagram of a decompression assist circuit for performing in-storage decompression, according to an embodiment of the present invention.

FIG. 6 shows a decompression assist circuit 315 that may be employed in some embodiments, e.g., in the embodiments of FIGS. 3-5. Within the decompression assist circuit 315, a microprocessor 610 is connected to the storage controller 115 (e.g., if the decompression assist circuit 315 is external to the storage controller 115, as in the embodiment of FIG. 5), or to a processing circuit within the storage controller 115 (e.g., if the decompression assist circuit 315 is external to the storage controller 115, as in the embodiments of FIGS. 3 and 4). This connection provides a control path (e.g., a control bus) through which the storage controller 115 or the processing circuit within the storage controller 115 may send instructions and parameters (such as decompression commands and the decompression instructions and destination locations contained in them) to the microprocessor 610. In this embodiment, the decompression algorithm is implemented in software using the set of instructions and parameters received from host 110. The microprocessor 610 is also connected to a decompression buffer 615. In response to the instructions and parameters it receives, the microprocessor 610 decompresses compressed data in the decompression buffer 615 and stores the decompressed data in the decompression buffer 615.

Prior to each decompression operation, the compressed data (e.g., a portion of the quantity of compressed data specified in the decompression command) are copied into the decompression buffer 615 (e.g., by a suitable circuit in the decompression assist circuit 315) and after each decompression operation, the decompressed data are stored in the storage media 120 (e.g., by a suitable circuit in the decompression assist circuit 315).

Figure 7:
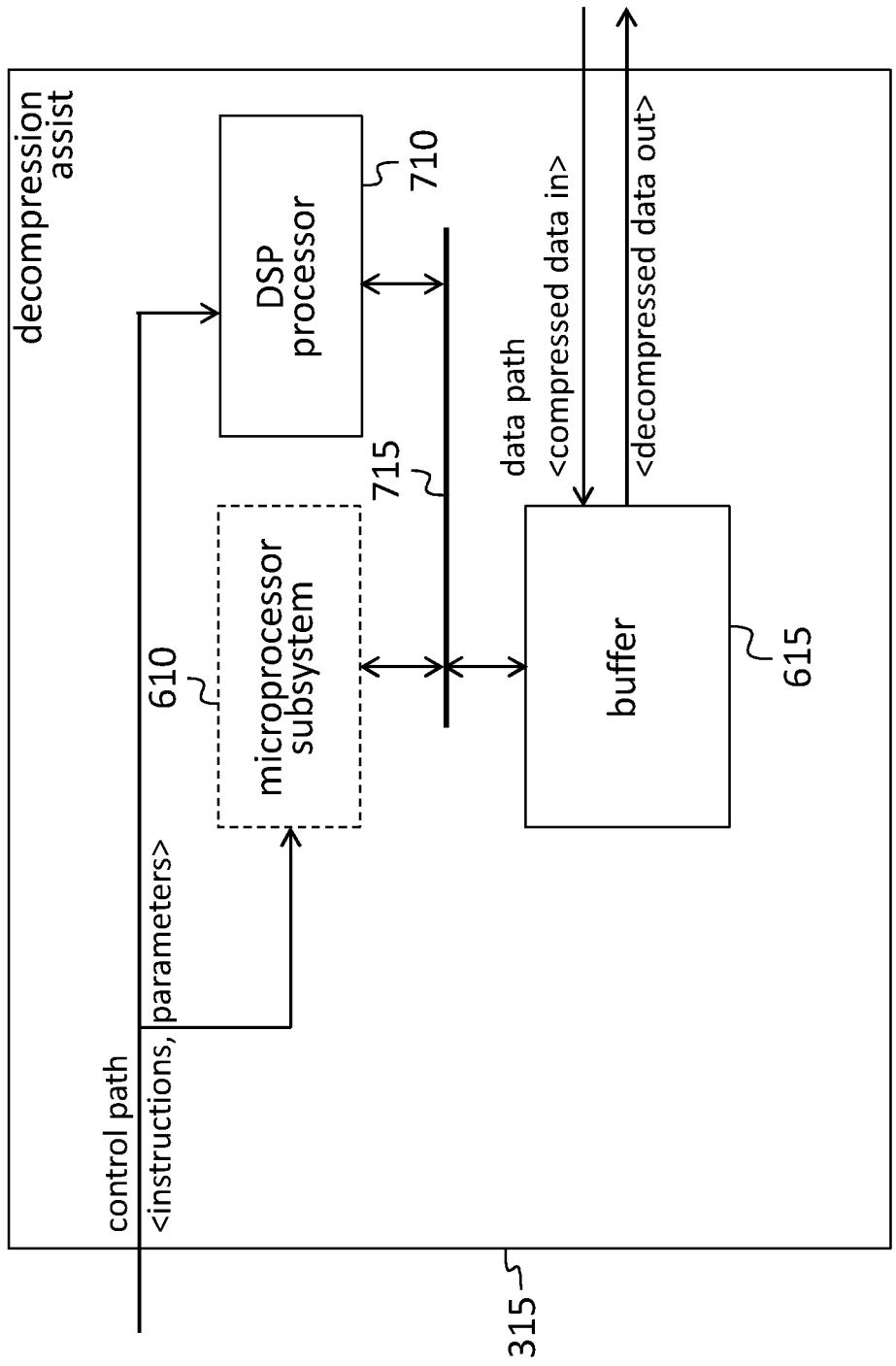
FIG. 7 is a block diagram of a decompression assist circuit for performing in-storage decompression, according to an embodiment of the present invention.

Referring to FIG. 7, in some embodiments, the decompression assist circuit 315 includes a digital signal processing circuit 710 (or digital signal processor (DSP)) in addition to, or instead of, the microprocessor 610, which may be optional in the embodiment of FIG. 7. The digital signal processor 710 may be a very large instruction word (VLIW) processor circuit capable of performing in a single operation arithmetic or logical operations that may require multiple operations (and that may consume more energy) if performed on, e.g., a microprocessor having shorter instruction words. For example, the digital signal processor 710 may have an instruction word length exceeding 32 bits. In the embodiment of FIG. 7, the microprocessor 610 may be optional, and the decompression algorithm may be implemented in software using set of instructions and parameters received from host. The software may execute on the digital signal processor 710 and/or on the microprocessor 610 (if present).

Figure 8:
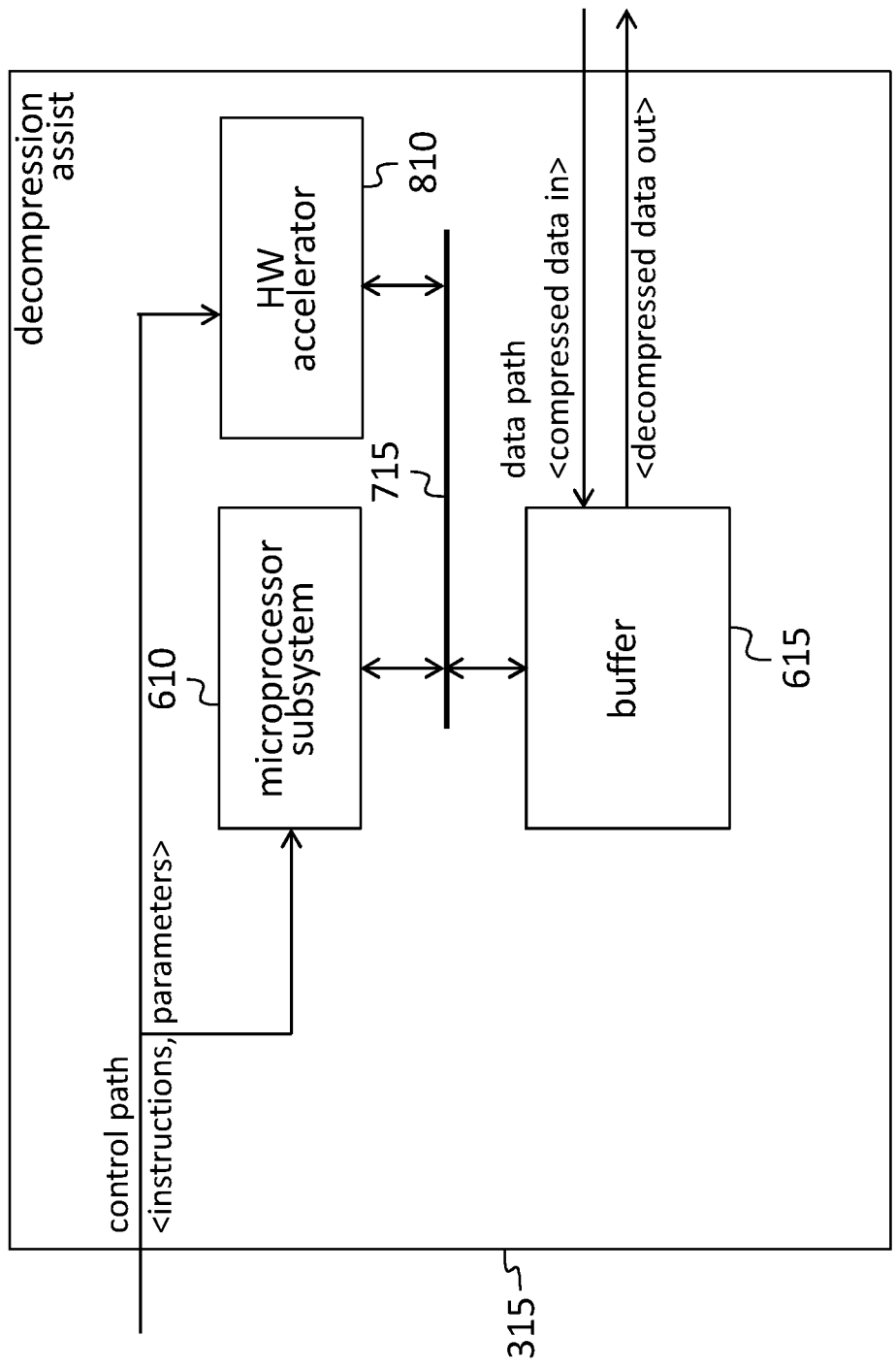
FIG. 8 is a block diagram of a decompression assist circuit for performing in-storage decompression, according to an embodiment of the present invention.

Referring to FIG. 8, in some embodiments the decompression assist circuit 315 includes a hardware accelerator 810, that may be a processing circuit designed to execute, quickly and/or with high energy efficiency, functions that are used in decompression algorithms. The hardware accelerator 810 may be embedded within the storage controller 115 or external to the storage controller 115. The microprocessor 610 may manage the decompression operation, and delegate to the hardware accelerator 810 the execution of any functions or operations which the hardware accelerator 810 is better able to perform than the microprocessor 610. In other embodiments the hardware accelerator 810 may be an integrated circuit, including a plurality of portions each of which is a "hardware decompressor", i.e., a circuit that is hard-wired to perform decompression according to a particular decompression algorithm. In such an embodiment the decompression instructions that are part of the decompression command may include an identifier that selects a decompression algorithm from among the decompression algorithms available in the hardware accelerator 810, and the microprocessor 610 may command the hardware accelerator 810 to decompress the data using the appropriate one of the available algorithms. If a decompression algorithm is not available in the hardware accelerator 810, the decompression command may, as in an embodiment lacking a hardware accelerator 810, include either directly executable instructions or instructions that may be translated into directly executable instructions, for decompressing the data.

Figure 9:
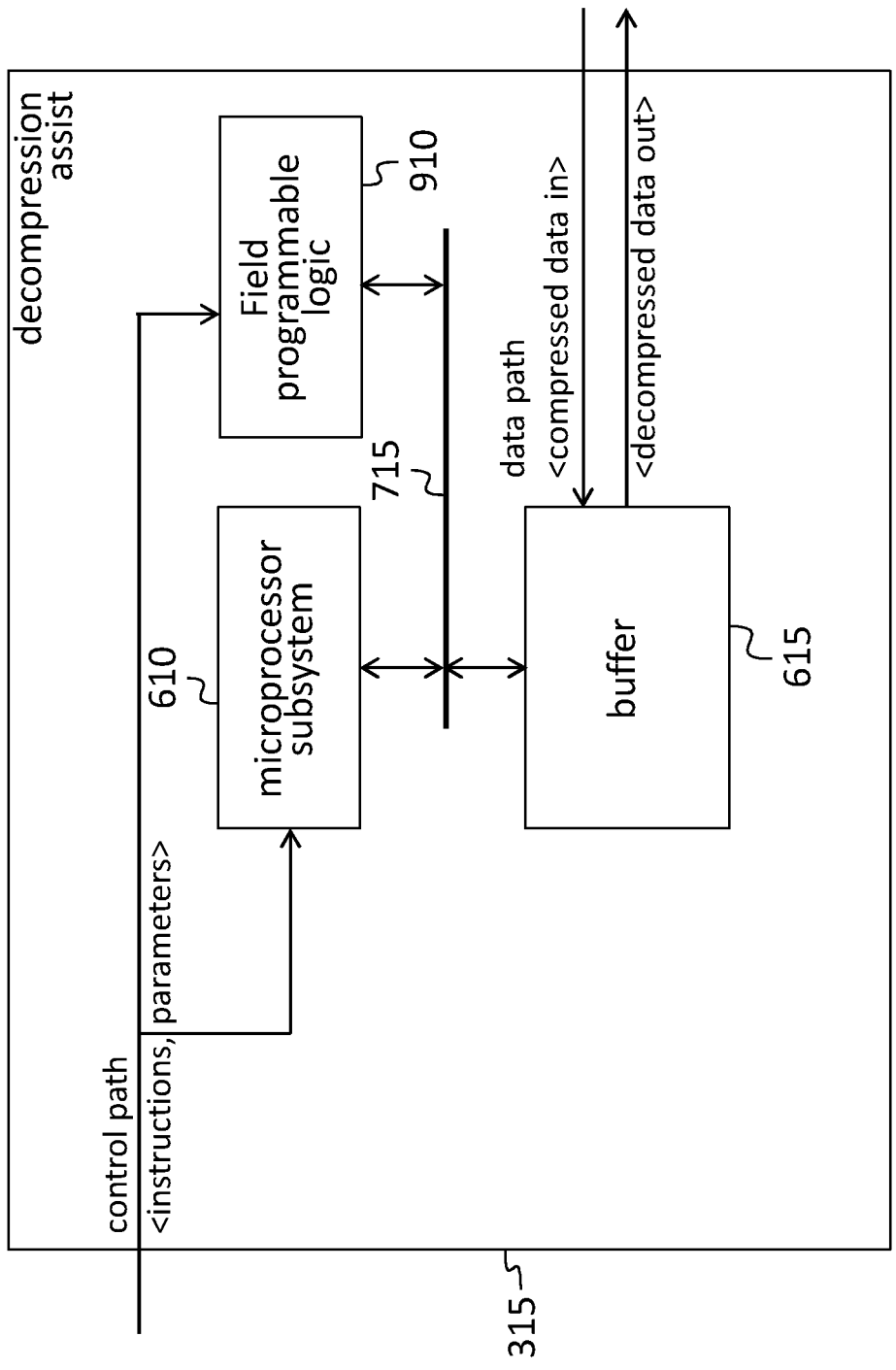
FIG. 9 is a block diagram of a decompression assist circuit for performing in-storage decompression, according to an embodiment of the present invention.

Referring to FIG. 9, in some embodiments the decompression assist circuit 315 includes a programmable digital circuit 910, such as an FPGA, and the decompression instructions are a logic program used to configure the programmable digital circuit 910. In the embodiment of FIG. 9, the microprocessor 610 may manage the copying of data between the storage media 120 and the buffer 615, and the loading of the logic program into the programmable digital circuit 910, and the programmable digital circuit 910 may perform the decompression.

Various methods of communication between the host 110 and the storage device 105 may be used to send the decompression command to the storage device 105 and for the storage device to send a completion message (i.e., a message indicating that the commanded decompression operation has been completed) to the host 110. For example, the specifications of certain storage protocols, such as NVMe, include custom commands that may be called by a suitable driver executing in the host, and recognized by the storage device 105 as representing a decompression command. In other embodiments a standard command directed to a reserved address range may be used. For example, the driver may send an NVMe write command to an address within a range of addresses reserved for the transmission of decompression commands to the storage device, and the payload of the write command may be the decompression command, or a transmission control protocol/internet protocol (TCP/IP) packet, the payload of which is the decompression command. The storage device 105 may recognize, from the address, that the NVMe command is not intended as a write command but rather a wrapper for a decompression command, and unpack the decompression command accordingly (e.g., as the payload of the NVMe command or as the payload of a TCP/IP packet that is the payload of the NVMe command).

In view of the foregoing, some embodiments provide a system and methods for in-storage on-demand data decompression. Compressed data are stored in a storage device connected to a host computer. When decompressed data are needed, the host computer sends a decompression command to the storage device indicating which data are to be decompressed, and instructing it how to decompress the data. The storage device decompresses the data and stores the decompressed data, making it available to the host.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and methods for in-storage on-demand data decompression have been specifically described and illustrated herein, many modifications and variations will be apparent to those skilled in the art. Accordingly, it is to be understood that a system and methods for in-storage on-demand data decompression constructed according to principles of this invention may be embodied other than as specifically described herein. The invention is also defined in the following claims, and equivalents thereof.

What is claimed is:

1. A storage device, comprising:
    a storage interface, configured to be connected to a host computer,
    a digital circuit; and
    persistent storage media,
    the digital circuit being configured to:
        receive, from the host computer, through the storage interface, a decompression command comprising:
            an identifier, identifying a quantity of compressed data; and
            decompression instructions for decompressing the compressed data;
        retrieve the quantity of compressed data from the storage media; and
        decompress the compressed data, according to the decompression instructions,
    wherein the storage interface is NVMe, and the decompression command is part of an NVMe command, the NVMe command having an address selected from among a range of addresses reserved for transmission of decompression commands to the storage device.

2. The storage device of claim 1, wherein the digital circuit is further configured to:
    receive, from the host computer, through the storage interface, a location identifier, identifying a destination location where the decompressed data are to be stored; and
    store the decompressed data at the destination location.

3. The storage device of claim 1, wherein the decompression command is part of a payload of a transmission control protocol/internet protocol (TCP/IP) packet, the TCP/IP packet being part of the payload of the NVMe command.

4. The storage device of claim 1, wherein the digital circuit is further configured to send a completion message to the host computer, after the compressed data have been decompressed.

5. The storage device of claim 1, wherein the storage device is configured as an object store, and the quantity of data is an object.

6. The storage device of claim 1, wherein the digital circuit is a processing circuit configured to decompress the compressed data by directly executing the decompression instructions.

7. The storage device of claim 1, wherein the digital circuit is a processing circuit configured to translate the decompression instructions into directly executable instructions, and to decompress the compressed data by directly executing the directly executable instructions.

8. The storage device of claim 1, wherein the digital circuit is a programmable digital circuit, and the decompression instructions are a logic program.

9. The storage device of claim 1, wherein the digital circuit is a digital signal processor having an instruction word length greater than 32 bits.

10. The storage device of claim 1, wherein the digital circuit comprises a hardware accelerator configured to execute a plurality of functions, each of the functions being a component of one or more of a plurality of decompression methods.

11. The storage device of claim 1, wherein the digital circuit comprises:
    a first hardware decompressor configured to perform decompression according to a first decompression method; and
    a second hardware decompressor configured to perform decompression according to a second decompression method, and
    wherein the decompression instructions include an identifier identifying one member of a list of decompression methods.

12. A method for operating a storage device comprising persistent storage media and connected, through a storage interface, to a host computer, the method comprising:
    receiving, by the storage device, from the host computer, through the storage interface, a decompression command comprising:
        an identifier, identifying a quantity of compressed data; and
        decompression instructions for decompressing the compressed data;
    retrieving the quantity of compressed data from the storage media; and
    decompressing the compressed data, according to the decompression instructions,
    wherein the storage interface is Non Volatile Memory Express (NVMe), and the decompression command is part of an NVMe command, the NVMe command having an address selected from among a range of addresses reserved for transmission of decompression commands to the storage device.

13. The method of claim 12, further comprising:
  receiving, from the host computer, through the storage interface, a location identifier, identifying a destination location where the decompressed data are to be stored; and
  storing the decompressed data at the destination location.

14. The method of claim 12, wherein the decompressing of the compressed data, according to the decompression instructions, comprises decompressing of the compressed data by directly executing the decompression instructions.

15. The method of claim 12, wherein the decompressing of the compressed data, according to the decompression instructions, comprises translating the decompression instructions into directly executable instructions, and decompressing of the compressed data by directly executing the directly executable instructions.

16. The method of claim 12, wherein the decompressing of the compressed data, according to the decompression instructions, comprises configuring a programmable digital circuit according to the decompression instructions, and decompressing of the compressed data by the programmable digital circuit.

17. The method of claim 12, wherein the decompression command is part of a payload of a transmission control protocol/internet protocol (TCP/IP) packet, the TCP/IP packet being part of the payload of the NVMe command.

* * * * *